United States Patent
Li

(10) Patent No.: US 8,370,617 B2
(45) Date of Patent: Feb. 5, 2013

(54) BOOTING METHOD AND COMPUTER SYSTEM USING THE BOOTING METHOD

(75) Inventor: Yong Li, Taipei (TW)

(73) Assignee: VIA Technologies, Inc., Hsin-Tien, Taipei (KR)

( * ) Notice: Subject to any disclaimer, the term of this patent is extended or adjusted under 35 U.S.C. 154(b) by 337 days.

(21) Appl. No.: 12/756,322

(22) Filed: Apr. 8, 2010

(65) Prior Publication Data
US 2011/0010532 A1 Jan. 13, 2011

(30) Foreign Application Priority Data
Jul. 7, 2009 (TW) .............................. 98122928 A

(51) Int. Cl.
G06F 9/00 (2006.01)
(52) U.S. Cl. ............................................... 713/2; 713/1
(58) Field of Classification Search ............ 713/2, 1
See application file for complete search history.

(56) References Cited

U.S. PATENT DOCUMENTS

| | | | | |
|---|---|---|---|---|
| 6,098,158 A * | 8/2000 | Lay et al. | ...................... | 711/162 |
| 6,279,109 B1 * | 8/2001 | Brundridge | ...................... | 713/2 |
| 6,965,989 B1 * | 11/2005 | Strange et al. | ...................... | 713/1 |
| 7,529,921 B2 * | 5/2009 | Stein et al. | ...................... | 713/1 |
| 7,583,457 B2 * | 9/2009 | Miller et al. | ...................... | 360/30 |
| 7,757,112 B2 * | 7/2010 | Childs et al. | ...................... | 714/5.1 |
| 2004/0073783 A1 * | 4/2004 | Ritchie | ...................... | 713/1 |
| 2004/0158711 A1 * | 8/2004 | Zimmer | ...................... | 713/165 |
| 2005/0210476 A1 * | 9/2005 | Wu et al. | ...................... | 719/310 |
| 2005/0240755 A1 * | 10/2005 | Stein et al. | ...................... | 713/1 |
| 2005/0240756 A1 * | 10/2005 | Mayer | ...................... | 713/2 |
| 2006/0230170 A1 * | 10/2006 | Chintala et al. | ...................... | 709/231 |
| 2006/0236165 A1 * | 10/2006 | Cepulis et al. | ...................... | 714/721 |
| 2006/0242398 A1 * | 10/2006 | Fontijn et al. | ...................... | 713/2 |
| 2006/0282654 A1 * | 12/2006 | Veen et al. | ...................... | 713/1 |
| 2008/0091874 A1 * | 4/2008 | Waltermann et al. | ...................... | 711/112 |
| 2010/0058046 A1 * | 3/2010 | John et al. | ...................... | 713/2 |

FOREIGN PATENT DOCUMENTS

| | | |
|---|---|---|
| CN | 1460929 | 12/2003 |
| CN | 1641580 | 7/2005 |
| CN | 1904831 | 1/2007 |

OTHER PUBLICATIONS

Chinese language office action dated May 24, 2011.
English language translation of abstract of CN 1641580 (published Jul. 10, 2005).
English language translation of abstract of CN 1460929 (published Dec. 10 2003).
English language translation of abstract of CN 1904831 (published Jan. 31, 2007).

* cited by examiner

*Primary Examiner* — Chun Cao
(74) *Attorney, Agent, or Firm* — McClure, Qualey & Rodack, LLP

(57) ABSTRACT

A booting method adaptable to a computer system having a processor, a memory and a bootable medium, wherein the bootable medium has an operating system, the booting method comprises the steps of activating a basic input/output system (BIOS); reserving a reserved area in the memory according to a setting of a setting space; copying the operating system from the bootable medium to the reserved area as an operating system copy; and activating the operating system copy from the reserved area.

20 Claims, 5 Drawing Sheets

BOOTING METHOD AND COMPUTER SYSTEM USING THE BOOTING METHOD

CROSS REFERENCE TO RELATED APPLICATIONS

This Non-provisional application claims priority under 35 U.S.C. §119(a) on Patent Application No(s). 98122928, filed in Taiwan, Republic of China on Jul. 7, 2009, the entire contents of which are hereby incorporated by reference.

BACKGROUND OF THE INVENTION

1. Field of the Invention

The present invention relates to a boot process of a computer system, and in particular to a technology used for speeding up loading an operating system.

2. Description of the Related Art

A computer system, generally comprising a processor, a memory and a hard disk, is usually managed by a basic input/output system (BIOS). An operating system loaded to the computer system brings the functions of the computer system into full play. There are several phases in the boot process of the computer system: the BIOS initiates the components of the computer system one by one, and then activates a boot loader in the hard disk or activates the operating system directly. Since there are lots of components in the computer system, it may take 10-16 seconds to initiate all the components one by one. According to the specification of the BIOS (or the boot loader), the computer system may read the operating system, which will be executed by the processor, from the hard disk. However, this reading process also takes a lot of time (for example, 40 seconds to 1 minute). But in fact, not all of the components are necessary for the loading of the operating system. Therefore, there exists a booting method which activates the operating system much more quickly.

BRIEF SUMMARY OF THE INVENTION

The present invention provides a booting method adaptable for use with a computer system comprising a processor, a memory and a bootable medium, wherein the bootable medium comprises an operating system, the booting method comprising the steps of activating a basic input/output system (BIOS); reserving a reserved area in the memory according to a setting of a setting space; copying the operating system from the bootable medium to the reserved area as an operating system copy; and activating the operating system copy from the reserved area.

The present invention further provides a computer system, comprising a processor, a memory, a bootable medium and a basic input/output system (BIOS); wherein the bootable medium comprises an operating system; the processor activates the BIOS; the BIOS reserves a reserved area on the memory according to a setting of a setting space, and copies the operating system from the bootable medium to the reserved area as an operating system copy, and then the processor activates the operating system copy from the reserved area. A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
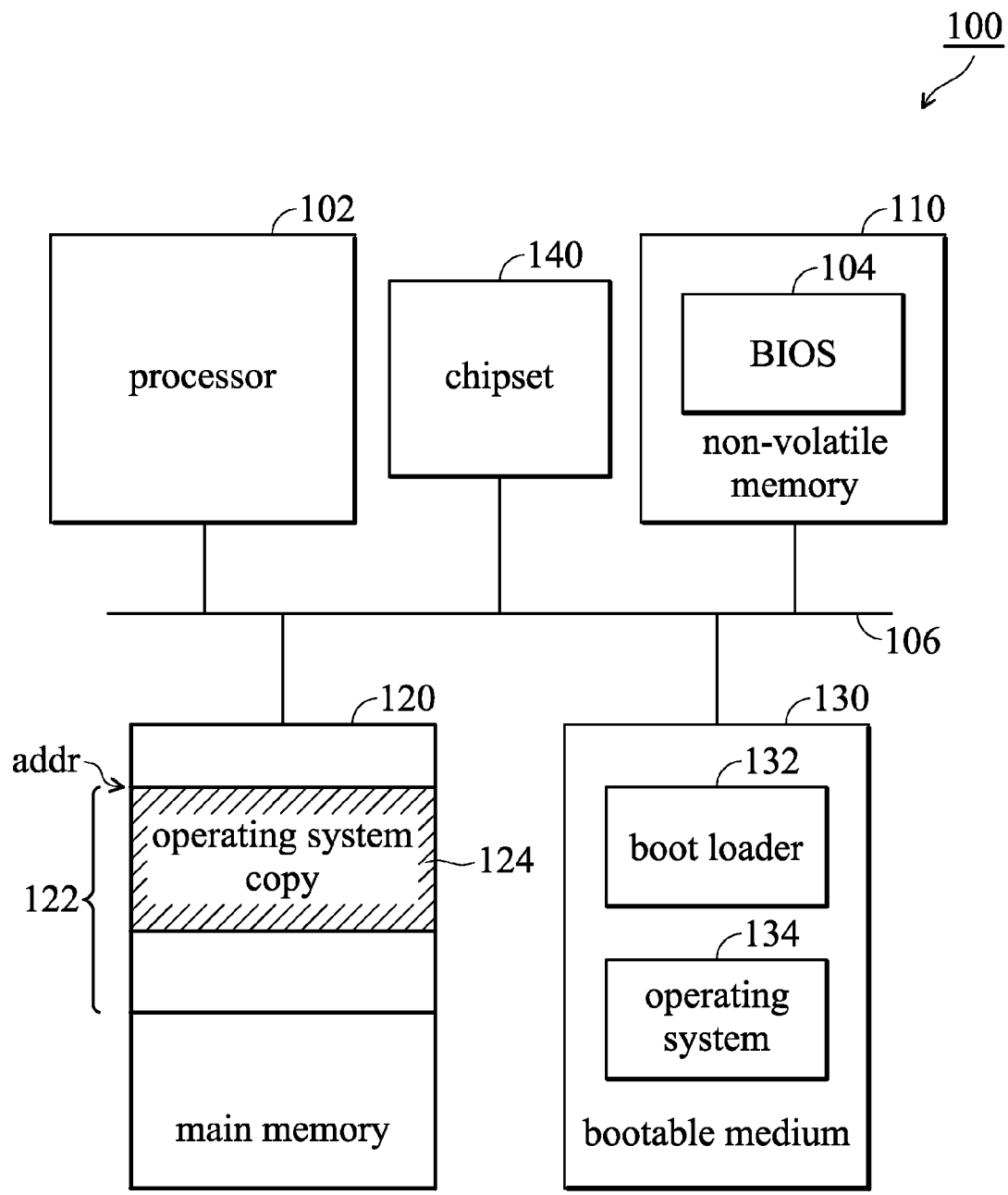
FIG. 1 is a schematic diagram of a computer system 100 according to an embodiment of the present invention.

FIG. 1 is a schematic diagram of a computer system 100 according to an embodiment of the present invention. The computer system 100, as simplified, comprises a processor 102, a non-volatile memory 110, a bus 106, a main memory 120, a bootable medium 130 and a chipset 140. The non-volatile memory 110 is used for storing a basic input/output system (BIOS) 104, which controls the entire boot process. The bootable medium 130 is used for storing a boot loader 132 and an operating system 134, i.e., the bootable medium 130 could be a hard disk. The boot loader 132 usually provides additional services, where one of those services is to preset various activation environments that the operating system requires before loading the operating system. For example, the boot loader 132 may provide a boot menu for multiple operating systems or multiple boot modes.

In order to speed up the boot process, the BIOS 104 of the preset invention copies the operating system 134 to the main memory 120 when the BIOS 104 initiates unnecessary components. Since the reading speed of the main memory 120 is usually much faster than that of the bootable medium 130, loading the operating system from the main memory 120 is advantageous in speeding up the booting process. To copy the operating system 134 to the main memory 120 in advance, a reserved area 122 has to be reserved in the main memory 120 for storing a copy of the operating system 124. The space allocation in the main memory 120, which is performed after loading a kernel of the operating system 134, is controlled by a memory manager of the kernel. If there is no area reserved in the main memory 120, the operating system, when in operation, may occupy the space in the main memory 120 for storing the operating system copy 124 with the hardware drivers or other software and thus may cause errors. Therefore, reserving a reserved area in the main memory 120 is necessary for preventing the software and hardware conflicts in next processes. The method of the present invention will be further discussed below with a flow chart of FIG. 2 as well as FIG. 1.

Figure 2:
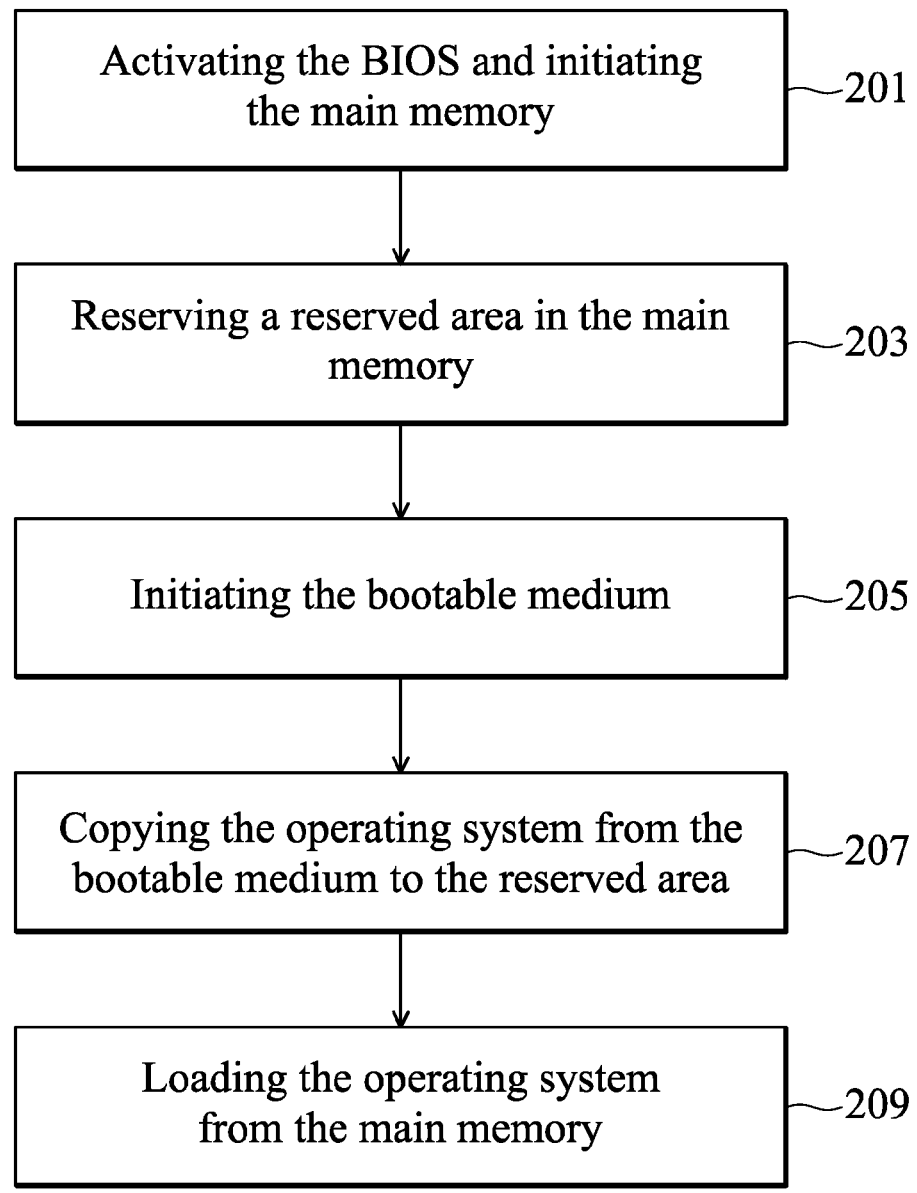
FIG. 2 is a flow chart of the boot process of the computer system according to an embodiment of the present invention.

FIG. 2 is a flow chart of the boot process of the computer system according to an embodiment of the present invention. First, the computer system 100 is powered on, then the processor 102 reads the non-volatile memory 110 and activates the BIOS 104 therein to initiate the main memory 120 in step 201. Next, in step 203, a space in the main memory 120 with a fixed address is reserved as the reserved area 122 for loading the operating system 134 without conflicts with other software and hardware drivers. The fixed address may be predefined in a setting space. The specific method for reserving the reserved area will be further discussed with FIG. 3.

After reserving the reserved area 122 in the main memory 120, the BIOS 104 initiates the bootable medium 130 in step 205. Only by initiating the bootable medium 130 could the operating system 134 be read out. The operating system 134 may be an image file with a size which varies, depending on the specification of the computer system 100. For example, when the operating system 134 is a small Linux operating system with a size of 200MB while the main memory 120 has a size of 2GB, the reserved area 122 may be 300MB continuous space with address beginning from 0x0000H.

Next, in step 207, the BIOS 104 starts to copy the operating system 134 from the bootable medium 130 to the reserved area 122 of the main memory 120. Step 207, which involves copying the operating system 134, may take several seconds. Assuming that the transmission rate from the bootable medium 130 to the main memory 120 is 60 MB per second and the size of the operating system is 200 MB, it may take 3-4 seconds to copy the operating system. In this embodiment, the copying progress may be immediately recorded in a space, for example, a register (not shown) or somewhere in the main memory 120, which is accessible to the BIOS 104, the boot loader 132 and the operating system. In other embodiment, the copying progress may be the address of the next sector to be copied in the bootable medium 130. When performing the copying step, the BIOS 104 may initiate the other components of the computer system 100 at the same time for making full use of time. For example, while copying the operating system, the BIOS 104 may initiate the universal serial bus (USB), a sound card, an Ethernet card and various peripheral devices (not shown).

When the BIOS 104 accomplishes the initiation the computer system 100, the method proceeds to step 209. The step 209 initiates the activation environment of the operating system before loading the operating system, and then loads the operating system copy 124 from the main memory 120. Generally, it takes 40-60 seconds to load the operating system 134 from the bootable medium 130, but it only takes 5-10 seconds to load the operating system copy 124 from the main memory 120 when using the present invention. The performance of the computer system is greatly improved.

In another embodiment, when the BIOS 104 accomplishes the initiation of the computer system 100, the processor 102 may execute the boot loader 132. The boot loader 132 may further provide a menu for the user to choose one of several operating systems and initiates the activation environment according to the selected operating system. If the copying process (copying the operating system 134 to the main memory 120) is not finished yet, the boot loader 132 will continue the copying process in the background that the boot loader 132 at the same time initiates the activation environment of the operating system. Therefore, conflicts may be prevented.

In other embodiments, the processor 102 can copy the operating system 134 to the main memory 120 and execute the operating system copy 124 at the same time (it is not necessary for the processor 102 to wait for all the operating systems 134 to finish copying before executing the operating system copy 124). For example, when the BIOS 104 and the boot loader 132 are both completely initiated but the copying process (copying operating system 134) just goes halfway, the processor 102 can execute the former part of the codes of the operating system copy 124, which apply a data stream technology to further copy the latter part of the codes of the operating system 134 during executing the operating system copy 124 at the same time.

Further, if the size of the operating system 134 exceeds the space provided by the main memory 120, the reserved area 122 may be treated as a first in first out (FIFO) cache, and the operating system 134 may be treated as a data stream and read or executed by batch processing.

Figure 3:
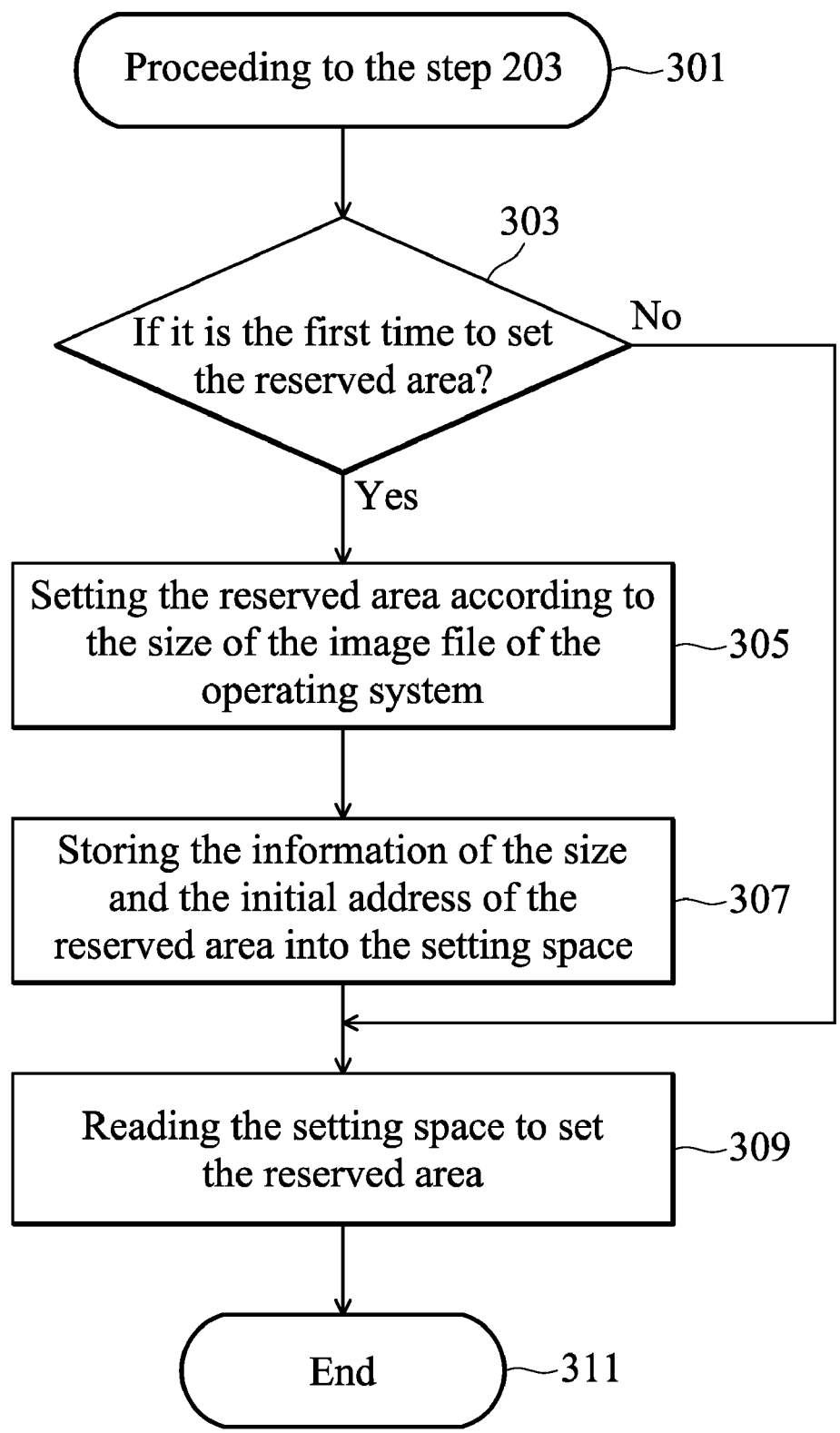
FIG. 3 is a flow chart illustrating the steps of reserving a reserved area according to an embodiment of the present invention.

FIG. 3 is a flow chart illustrating the steps of reserving a reserved area according to an embodiment of the present invention. In step 301, the method of the present invention proceeds to the step 203 of FIG. 2. Step 203 comprises a plurality of steps which are discussed below. In step 303, the BIOS 104 reads a setting space to determine if it is the first time that the operating system 134 has been used to boot the computer system. The setting space, which records the last boot, the version of the operating system used in the last boot, the size of the image file of the operating system and the size and the initial address of the reserved area 122, may be space in the non-volatile memory 110 of the BIOS 104 or may be space in the bootable medium 130. If the operating system 134 has set the reserved area 122 in the last boot, the present invention directly proceeds to step 309. Otherwise, if there is no record indicating that the operating system has ever been used to boot the computer system, or that the operating system 134 has never set a reserved area, the present invention proceeds to step 305 which sets the reserved area 122 according to the size of the image file of the operating system 134. For example, the initial address of the reserved area 122 may be set at address, 0xoooH, of the main memory 120, and the size of the reserved area 122 may be greater or equal to the size of the image file of the operating system 134, or just equal to the size of some part of the operating system 134 which needs copying to the reserved area 122. After setting the reserved area 122, the present invention proceeds to step 307 which stores the information of the size and the initial address of the reserved area 122 into the setting space.

Next, the present invention proceeds to step 309, where the BIOS 104 reads the setting relating to the reserved area (the size and the initial address) from the setting space in order to set the reserved area. After that, the present invention finishes the reserving step 203 and returns back to FIG. 2 to execute the steps after the step 203. The step 305 (setting the reserved area 122 in the main memory 120) may be performed by the memory manager and accomplished through a normal boot process. When the computer system boots again, the BIOS 104 can read the setting space to acquire information of the initial address and the size of the reserved area. Therefore, copying the operating system and initiating the components are performed at the same time.

Figure 4:
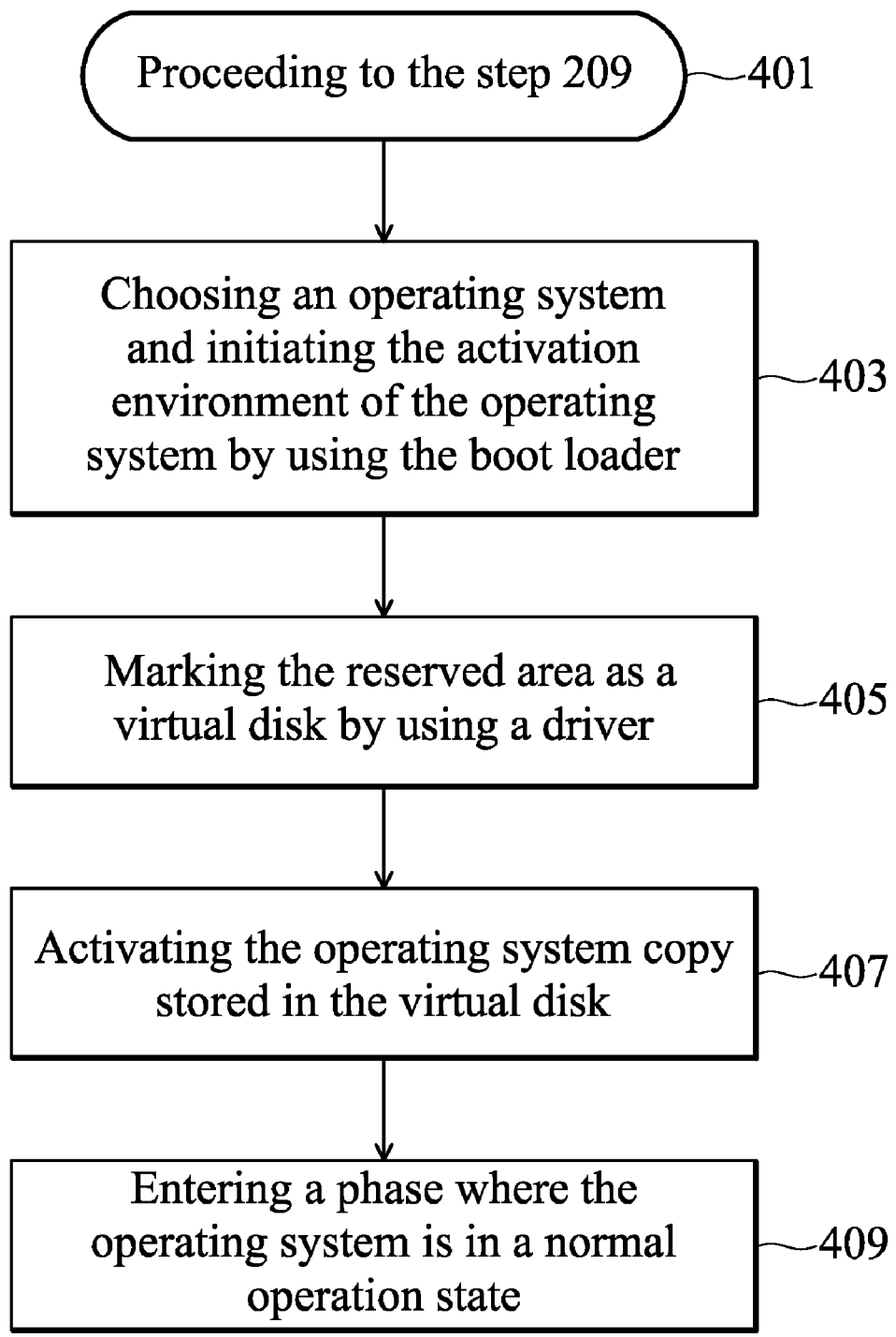
FIG. 4 is a flow chart illustrating the step of loading the operating system according to an embodiment of the present invention.

FIG. 4 is a flow chart illustrating the step of loading the operating system according to an embodiment of the present invention. Step 209 (loading the operating system from the memory), as shown in FIG. 2, comprises a plurality of steps which are discussed below. In step 401, the BIOS 104 and the boot loader 132 are ready to activate the operating system. In step 403, the boot loader 132 chooses an operating system and initiates the activation environment of the operating system. As described above, this step could also be performed by the BIOS 104 (for example, through using the 13th interrupt program (INT. 13) of the service programs of the BIOS 104). The step of initiating the activation environment of the operating system, for example, comprises: loading a kernel of the operating system copy 124 such as a processor manager, a memory manager, and etc. After initiating the memory manager, all the hardware drivers or other software applications applying for memory spaces from the memory manager will be prevented from using the reserved area 122 since the reserved area 122 has been previously reserved for storing the operating system copy 124. Next, the present invention proceeds to step 405. Step 405 marks the reserved area 122 as a virtual disk by using a driver to indicate the processor to activate the operating system from the reserved area 122 (virtual disk) rather than the bootable medium 130. Next, the present invention proceeds to step 407, the processor 102 treats the reserved area 122 as a virtual disk and activates the operating system copy 124 stored therein. The operating system may treat the reserved area 122 as another disk besides the bootable medium 130. In other embodiment, since the content of the operating system copy 124 is the same as that of the operating system 134, the reserved area 122 may be combined with the bootable medium 130 to form a mirror disk array (RAID-1). For example, in step 405, the BIOS 104 and the boot loader 132 provide drivers and mark the portion of the reserved area 122 storing the operating system copy 124 and the portion of the bootable medium 130 storing the operating system 134 as the mirror disk array. Therefore, the processor 102 may activate the operating system copy 124 stored in the mirror disk array in step 407. The present invention proceeds to step 409 to enter a phase where the operating system is in a normal operation state. Since there is a synchronized mirror relation built between the reserved area 122 of the main memory 120 and the corresponding sectors of the bootable medium 130, the operating system, when in the normal operation state, may directly read data from or write data in the reserved area 122 of the main memory 120, and then synchronize the reserved area 122 and the bootable medium 130 after a predetermined period. The access speed of the main memory 120 is faster than that of the bootable medium 130, and the main memory 120 bears most of the workload of reading and writing data. As a result, the performance of the operating system in the normal operation state is greatly improved.

Figure 5:
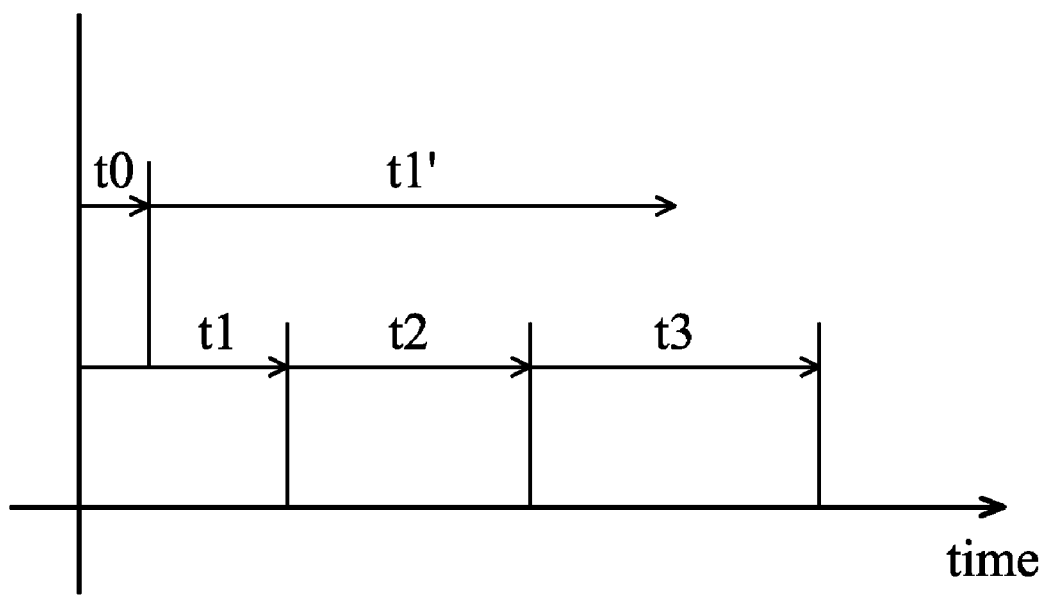
FIG. 5 is a timing diagram illustrating each phase of the present invention.

FIG. 5 is a timing diagram illustrating each phase of the present invention. The symbol t1 represents the phase for executing the BIOS; the symbol t2 represents the phase for executing the boot loader; the symbol t3 represents the phase for loading the operating system. In phase t1, the symbol t0 represents the time expended for initiating the memory and the bootable medium, i.e., the time expensed for accomplishing step 201 to step 205 in FIG. 2. The symbol t1' represents the phase for copying the operating system, i.e., the time of step 207 in FIG. 2 expended for copying the operating system from the bootable medium to the memory. As described above, the present invention raises the speed of the activation of the computer system by copying the operating system to the memory during executing the BIOS to initiate the computer. To achieve the purpose of the present invention, the BIOS of the present invention additionally comprises a function for copying the operating system. The operating system of the present invention additionally comprises the particular memory manger which can acquire the information about the address and the size of the reserved area by reading the setting space of the BIOS in order to prevent other hardware drivers or software applicant from accessing the reserved area. In addition to the BIOS, the copying step may also be performed by a hardware device such as the chipset 140 as shown in FIG. 1, or other hardware devices with firmware therein. After the boot process, hardware device such as the chipset 140 may automatically check the setting space to obtain the initial address and the size of the reserved area and then may copy the operating system to the reserved area of the main memory.

The operating system of the present invention could be a Linux, FreeBSD, Solaris, a Kernel of an embedded system or even Windows. The bootable medium for storing the operating system could be a hard disk and other storage devices which have larger capacities but lower transmission rates, such as USB storage, flash memory or compact disk.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A booting method adaptable for a computer system comprising a processor, a memory and a bootable medium, wherein the bootable medium comprises an operating system, the booting method comprising the steps of:
    activating a basic input/output system (BIOS);
    reserving a reserved area in the memory according to a setting of a setting space;
    copying the operating system from the bootable medium to the reserved area as an operating system copy; and
    activating the operating system copy from the reserved area,
    wherein the setting of the setting space is set by a memory manager of the operating system through a normal boot process of the computer system.

2. The booting method as claimed in claim 1, wherein the copying step is accomplished by the BIOS; and the BIOS initiates components within the computer system while simultaneously executing the copying step.

3. The booting method as claimed in claim 1, wherein the copying step is accomplished by a chipset or a hardware device with firmware therein.

4. The booting method as claimed in claim 1, wherein the reserving step further comprises the steps of:
    reading the setting space to determine if the reserved area has already been set for the operating system;
    continuing to use the setting of the reserved area if the reserved area has already been set; and
    setting the reserved area if the reserved area has not been set yet.

5. The booting method as claimed in claim 4, wherein, if the reserved
    area has not been set yet, the setting step further comprises:
    setting the reserved area according to a size of an image file of the operating system;
    recording the setting of the reserved area into the setting space.

6. The booting method as claimed in claim 4, wherein the setting step is accomplished by the memory manager.

7. The booting method as claimed in claim 1, wherein data in the setting space is not lost when the computer system is power off.

8. The booting method as claimed in claim 1 further comprises the step of initiating an activation environment of the operating system, wherein the initiating step is accomplished by a boot loader or the BIOS.

9. The booting method as claimed in claim 8 further comprises the step of:
    establishing a virtual disk on the reserved area of the memory, wherein the size of the virtual disk is relative to the size of an image file of the operating system copy; and
    activating the operating system copy from the virtual disk.

10. The booting method as claimed in claim 8 further comprising:
    combining the reserved area and the bootable medium as a mirror disk array, wherein the operating system of the bootable medium and the operational system copy of the reserved area form a synchronized mirror image; and activating the operating system copy from the reserved area.

11. The booting method as claimed in claim 8, wherein the boot loader further copies the operating system from the bootable medium to the reserved area.

12. The booting method as claimed in claim 1 further comprising the step of further copying the operating system from the bootable medium to the reserved area after activating the operating system copy.

13. The booting method as claimed in claim 8 further comprising the step of recording a copying progress, wherein the copying progress is accessible to the BIOS, the boot loader and the operating system.

14. A computer system, comprising:
   a processor, a memory, a bootable medium and a basic input/output system (BIOS), wherein:
   the bootable medium comprises an operating system;,
   the processor activates the BIOS;
   the BIOS reserves a reserved area on the memory according to a setting of a setting space, and copies the operating system from the bootable medium to the reserved area as an operating system copy, and then the processor activates the operating system copy from the reserved area,
   wherein the setting of the setting space is set by a memory manager of the operating system through a normal boot process of the computer system.

15. The computer system as claimed in claim 14, wherein the BIOS initiates components within the computer system during the BIOS copies the operating system from the bootable medium to the reserved area.

16. The computer system as claimed in claim 14, wherein:
   the BIOS reads the setting space, before reserving the reserved area, to determine if the reserved area has already been set for the operating system; the BIOS continues using the setting of the reserved area if the reserved area has already been set, or sets the reserved area if the reserved area has not been set yet.

17. The computer system as claimed in claim 16 further comprising the memory manager, wherein the memory manager sets the reserved area according to a size of an image file of the operating system, and records the setting of the reserved area into the setting space.

18. The computer system as claimed in claim 14 further comprises a boot loader, wherein the boot loader further copies the operating system from the bootable medium to the reserved area.

19. The computer system as claimed in claim 14, wherein the operating system copy further copies the operating system from the bootable medium to the reserved area after activating the operating system copy.

20. The computer system as claimed in claim 18 further comprises a copying progress, wherein the copying progress is accessible to the BIOS, the boot loader and the operating system.

\* \* \* \* \*